United States Patent Office 3,426,037
Patented Feb. 4, 1969

3,426,037
ALPHA-4-DIMETHYLAMINO AND PYRROLIDINO-1,2 DIPHENYL-3-METHYL-2-BUTYL CYCLOPROPANE CARBOXYLATES
John H. Biel and Rolf E. Graeve, Milwaukee, Wis., assignors to Aldrich Chemical Company, Inc., Milwaukee, Wis., a corporation of Wisconsin
No Drawing. Filed Apr. 6, 1966, Ser. No. 540,525
U.S. Cl. 260—326.3                                  7 Claims
Int. Cl. C07c 93/00; C07d 27/02; A61k 27/00

ABSTRACT OF THE DISCLOSURE

Alpha-4-dimethylamino and pyrrolidino-1,2-diphenyl-3-methyl - 2 - butylcyclopropane carboxylates prepared by esterification of 4-tertiaryamino-1,2-diphenyl-3-methyl-2-butanol with cyclopropanecarboxylic acid halide. The compounds are analgesics, or antitussives.

This invention relates to novel compounds. More particularly, this invention relates to novel compounds which possess valuable therapeutic utility as analgesics, and to novel compounds which possess valuable therapeutic utility as antitussives and to processes useful in the preparation thereof. In another aspect, this invention relates to a novel method of producing analgesia and reducing coughs in animals.

It is an object of the present invention to provide a new class of therapeutic compounds. It is another object of the present invention to provide novel compounds having analgesic activity and compounds having antitussive activity. It is a further object of the present invention to provide a process for preparing the novel therapeutic compounds. It is still a further object of the present invention to provide novel methods of producing analgesia and reducing coughs in animals.

These and other objects which may appear as the specification proceeds are achieved by this invention which comprises the provision of compounds selected from the group consisting of the α form of compounds having the following formula I
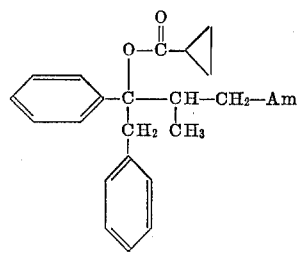

wherein Am is a radical selected from the group consisting of

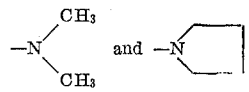

and the pharmaceutically acceptable nontoxic salts thereof.

The pharmaceutically acceptable nontoxic salts include the organic and inorganic acid addition salts, e.g., those prepared from acids such as hydrochloric, sulphuric, sulfamic, tartaric, fumaric, hydrobromic, hydriodic, glycolic, citric, maleic, phosphoric, succinic, acetic, nitric and the like. Such salts are prepared by conventional methods.

The compounds represented by Formula I possess two asymmetric carbon atoms and therefore occur in diastereoisomeric forms. In accordance with the usual practice, the less soluble diastereoisomer is designated as the α form, and the more soluble diastereoisomer as the β form. The present invention relates to the α form of the compounds of Formula I and may be the racemic mixture of the two optical isomers. Both isomers are biologically active and both of these isomers and mixtures thereof are included within the scope of the present invention. The individual isomers are prepared in pure form by starting with the pure dextro or levo form of the aminoalcohol of Formula II below or by resolution of a racemic mixture of the final product.

The dextro isomers possess analgesic activity making them useful for the treatment of pain in animals while the levo isomers possess antitussive activity making them useful for reducing coughs in animals. The β-diastereoisomers of the compounds of Formula I are substantially inactive and do not constitute a part of the present invention.

The compounds of this invention are prepared as exemplified below by esterification of the α form of an aminoalcohol of the formula II
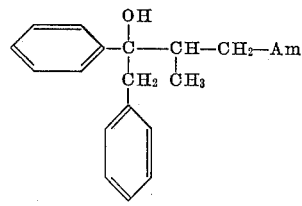

wherein Am is as described above, with a cyclopropanecarboxylic acid halide, e.g. bromide, chloride or iodide, preferably cyclopropanecarboxylic acid chloride. Preferably, the reaction is carried out in a nonreactive solvent such as benzene and in the presence of a tertiary amine such as triethyl amine at reflux temperature. The general procedure used for the preparation of the compounds of this invention is described by Biel et al., J. Am. Chem. Soc., 77, 2250 (1955).

The aminoalcohols used as starting materials in the preparation of the compounds of this invention as well as the separation of the diastereoisomers and the optical isomers is described by Pohland et al., J. Am. Chem. Soc., 75, 4460 (1953) and Pohland et al., J. Am. Chem. Soc., 77, 3400 (1955) and in U.S. Patent No. 2,728,779. The synthesis of 1,2-diphenyl-3-methyl-4-dimethylamino-2-butanol is also described by Stoll et al., Helv. Chim. Acta., XXXIII, 1194 (1950).

The compounds of this invention may be administered as the free bases or in the form of their nontoxic addition salts. They may be compounded and formulated into pharmaceutical preparations in unit dosage form for oral or parenteral administration with organic or inorganic solid materials or liquids which are pharmaceutically acceptable carriers. The compositions may take the form of tablets, powders, granules, capsules, suspensions, solutions and the like. Such compositions are considered within the scope of this invention.

The α-d isomers of the compounds of this invention when administered orally or parenterally in an effective amount are effective in the treatment of pain and the α-l isomers of the compounds of this invention when administered orally or parenterally in an effective amount are effective in the treatment of coughs.

The following examples are intended to illustrate the invention described herein without unduly restricting it.

Example 1.—Preparation of α-d-4-dimethylamino-1,2-diphenyl-3-methyl-2-cyclopropanecarboxybutane To a solution of α-d-4-dimethylamino-1,2-diphenyl-3-methyl-2-butanol (55.9 gm., 0.198 mol) and triethylamine (38.8 ml., 0.277 mol) in reagent benzene (600 ml.) there was added cyclopropanecarboxylic acid chloride (27.7 gm., 0.265 mol) dropwise over a period of one hour. The solution was refluxed for 13–14 hours and then evaporated almost to dryness in vacuo. The remaining oil, homogeneous by thin layer chromatography on alumina, was taken up in petroleum ether (300 ml.), decolorized over activated carbon and Dicalite and then filtered to yield a clear, straw yellow solution. Evaporation in vacuo left a yellow-orange oil (76.0 gm.). The oil could be induced to crystallize from petroleum ether with cooling (freezer). After recrystallization from the same solvent, there was obtained the product, α-d-4-dimethylamino-1,2-diphenyl-3-methyl - 2 - cyclopropanecarboxybutane, with M. P. 72–73° C. I.R. showed no hydroxyl absorption at 3–4 μ; a strong carbonyl peak at 5.8μ, M.W. 351.47.

Analysis.—Calc'd for $C_{23}H_{29}NO_2$: C, 78.59; H, 8.32; N, 3.99. Found: C, 78.54; H, 8.41; N, 4.01. $[\alpha]_D^{24}+65.9$ (c.=0.624, $CHCl_3$).

Example 2.—Preparation of α-d-4-dimethylamino-1,2-diphenyl - 3 - methyl - 2 - cyclopropanecarboxybutane hydrochloride The free base was converted into the hydrochloride by an equivalent amount of ethereal hydrochloric acid. No crystals could be obtained from ether, ethyl acetate, acetone, acetonitrile, methylene chloride or carbon tetrachloride. On evaporation in vacuo, a solid foam, α-d-4-dimethylamino - 1,2 - diphenyl-3-methyl-2-cyclopropanecarboxybutane hydrochloride was formed; M.P. 73–74° C.

Analysis.—Calc'd for $C_{23}H_{30}NO_2Cl$: C, 71.21; H, 7.79; N, 3.61; Cl, 9.14. Found: C, 70.91; H, 8.14; N, 3.50; Cl, 9.20.

This compound exhibited useful analgesic properties in animals.

The α - d - 4 - dimethylamino-1,2-diphenyl-3-methyl-2-cyclopropanecarboxybutane hydrochloride described above was tested for analgesic activity by the phenylquinone test of Sigmund et al., Proc. Soc. Exptl. Biol. and Med. 95, 729 (1957) in which an analgesic reduces the induced writhing of the mice. At dosages of 160 mgm./kg. p.o. in mice given 50 minutes before the phenyl-p-quinone was injected, the reduction in induced writhing at the end of the first hour was found to be 65% for aspirin and 100% for this compound. A reduction of 39% was obtained at a dose of 75 mgm./kg. This indicated that this compound is an analgesic agent.

Example 3.—Preparation of α-l-4-dimethylamino-3-methyl-1,2-diphenyl-2-cyclopropanecarboxybutane To a solution of α-l-4-dimethylamino-1,2-diphenyl-3-methyl-2-butanol (55.9 gm., 0.198 mol) and triethylamine (38.8 ml., 0.277 mol) in reagent benzene (600 ml.) there was added cyclopropanecarboxylic acid chloride (27.7 gm., 0.265 mol) dropwise over a period of one hour. The solution was refluxed for 13–14 hours and then evaporated almost to dryness in vacuo. The remaining oil, homogeneous by thin layer chromatography on alumina, was taken up in petroleum ether (300 ml.), decolorized over activated carbon and Dicalite and then filtered to yield a clear, straw yellow solution. Evaporation in vacuo left a yellow-orange oil. The oil could be induced to crystallize from petroleum ether with cooling (freezer). After recrystallization from the same solvent, there was obtained the product α-l-4-dimethylamino-1,2-diphenyl-3-methyl-2-cyclopropanecarboxybutane having a melting point of 71–72.5° C. and optical rotation $[\alpha]_D^{23}=-65$ (0.664, $CHCl_3$).

The hydrochloride was precipitated in anhydrous ether by treating the free base with anhydrous hydrogen chloride as a gummy oil, which could not be induced to crystallize. On evaporation in vacuo, a solid foam, α-l-4-dimethylamino - 1,2 - diphenyl-3-methyl-2-cyclopropanecarboxybutane hydrochloride, was obtained, M.P. 75–85° C.

This compound exhibited useful antitussive properties in animals.

The α-l-4-dimethylamino-1,2-diphenyl-3-methyl-2-cyclopropanecarboxybutane hydrochloride described above was tested for antitussive activity by a modification of the Winter-Flataker (J. Pharmacol, Exper. Therap. 112:99, 1954) test which consisted of inducing coughs in guinea-pigs with a 10% citric acid aerosol solution. When given at a dose of 50 mg./kg. subcutaneously, this compound produced an 85% reduction in the number of coughs at one hour after administration. This indicated that this compound is an antitussive agent.

Example 4

When, in the procedure of Example 1, α-d-4-dimethylamino-1,2-diphenyl-3-methyl-2-butanol is replaced by an equal molar amount of α-d-4-pyrrolidino-1,2-diphenyl-3-methyl-2-butanol and
α-l-4-pyrrolidino-1,2-diphenyl-3-methyl-2-butanol, there are obtained, α - d-4-pyrrolidino-1,2-diphenyl-3-methyl-2-cyclopropanecarboxybutane and α - l-4-pyrrolidino-1,2-diphenyl-3-methyl-2-cyclopropanecarboxybutane, respectively.

While the foregoing invention has been described and exemplified in terms of its preferred embodiment, those skilled in the art will appreciate that modifications can be made without departing from the spirit and scope of this invention.

What is claimed is:

1. A compound selected from the group consisting of the α form of a compound of the formula

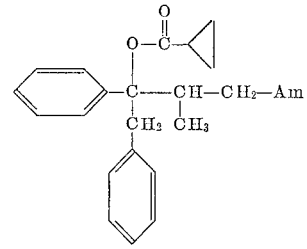

wherein Am is a radical selected from the group consisting of

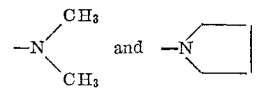

and the pharmaceutically acceptable nontoxic salts thereof.

2. The α form of the compound of claim 1 having the formula

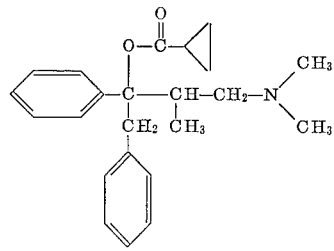

3. The α-d isomer of the compound of claim 2.
4. The α-l isomer of the compound of claim 2.

5. The α form of the compound of claim 1 having the formula
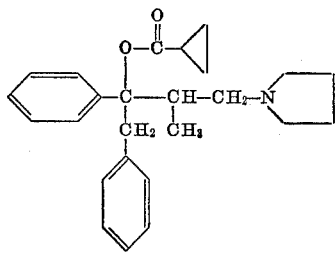
6. The α-d isomer of the compound of claim 5.
7. The α-l isomer of the compound of claim 5.
References Cited
UNITED STATES PATENTS
2,728,779  12/1955  Pohland _____ 260—326.3
ALEX MAZEL, Primary Examiner.
JOSE TOVAR, Assistant Examiner.
U.S. Cl. X.R.
260—468; 424—274, 305